US012602333B2

(12) United States Patent
Kim et al.

(10) Patent No.: US 12,602,333 B2
(45) Date of Patent: Apr. 14, 2026

(54) SECURE ELEMENT AND ELECTRONIC DEVICE INCLUDING THE SAME

(71) Applicant: Samsung Electronics Co., Ltd., Suwon-si (KR)

(72) Inventors: Sunghyun Kim, Suwon-si (KR); Keunyoung Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 308 days.

(21) Appl. No.: 18/342,969

(22) Filed: Jun. 28, 2023

(65) Prior Publication Data

US 2024/0004803 A1 Jan. 4, 2024

(30) Foreign Application Priority Data

Jun. 29, 2022 (KR) ........................ 10-2022-0080001
Aug. 23, 2022 (KR) ........................ 10-2022-0105777

(51) Int. Cl.
| | |
|---|---|
| G06F 12/14 | (2006.01) |
| G06F 13/28 | (2006.01) |
| G06F 21/71 | (2013.01) |
| G06F 21/72 | (2013.01) |
| G06F 21/79 | (2013.01) |
| H04L 9/32 | (2006.01) |
| H04L 9/40 | (2022.01) |

(52) U.S. Cl.
CPC .......... *G06F 12/1408* (2013.01); *G06F 13/28* (2013.01); *G06F 21/72* (2013.01); *H04L 9/3242* (2013.01); *G06F 21/71* (2013.01);

*G06F 21/79* (2013.01); *G06F 2212/1052* (2013.01); *H04L 63/10* (2013.01)

(58) Field of Classification Search
CPC ...... G06F 12/1408; G06F 13/28; G06F 21/72; H04L 9/3242
See application file for complete search history.

(56) References Cited

U.S. PATENT DOCUMENTS

| | | | | |
|---|---|---|---|---|
| 8,799,678 | B2 | 8/2014 | Buer | |
| 8,812,804 | B2 | 8/2014 | Goss et al. | |
| 9,063,891 | B2 * | 6/2015 | Kegel | G06F 12/1441 |
| 10,637,647 | B2 * | 4/2020 | Temple | H04L 9/004 |
| 10,719,606 | B2 | 7/2020 | Sanchez Diaz et al. | |
| 10,853,519 | B2 | 12/2020 | Pan | |
| 10,949,546 | B2 | 3/2021 | Chung et al. | |
| 2006/0095793 | A1 * | 5/2006 | Hall | G06F 12/1408 |
| | | | | 711/E12.102 |

(Continued)

OTHER PUBLICATIONS

EESR dated Oct. 6, 2023 for corresponding EP Patent Application No. 23182451.7.

*Primary Examiner* — Shanto Abedin
(74) *Attorney, Agent, or Firm* — Harness, Dickey & Pierce, P.L.C.

(57) ABSTRACT

A secure element (SE) coupled to a system-on-chip (SoC) includes an internal memory, virtual secure direct memory access (DMA) circuitry configured to perform a secure operation using an external memory connected to the SoC in association with the internal memory, and SE interface circuitry configured to output secure data and a write request generated by the virtual secure DMA circuitry to the SoC, the secure data being stored in the external memory.

19 Claims, 16 Drawing Sheets

(56)          References Cited

U.S. PATENT DOCUMENTS

| | | | |
|---|---|---|---|
| 2016/0026799 A1* | 1/2016 | Hershman ............. | H04L 9/3234 |
| | | | 726/1 |
| 2016/0299854 A1* | 10/2016 | Deivasigamani ....... | G06F 21/79 |
| 2019/0042765 A1* | 2/2019 | Chung .................. | G06F 21/575 |
| 2019/0130120 A1* | 5/2019 | Lal ......................... | H04L 9/3215 |
| 2020/0127836 A1* | 4/2020 | Pappachan ............. | G06F 21/52 |
| 2020/0358620 A1 | 11/2020 | Kim et al. | |
| 2021/0149824 A1* | 5/2021 | Satpathy .............. | G06T 19/006 |

* cited by examiner

SoC 211  1st Interface Circuitry 212  2nd Interface Circuitry 220  1st Secure Element 221  1st SE Interface Circuitry 230  2nd Secure Element 231  2nd SE Interface Circuitry 240  External Memory 241  1st Region 242  2nd Region

FIG. 14

SECURE ELEMENT AND ELECTRONIC DEVICE INCLUDING THE SAME

CROSS-REFERENCE TO RELATED APPLICATIONS

This application is based on and claims priority under 35 U.S.C. § 119 to Korean Patent Application Nos. 10-2022-0080001, filed on Jun. 29, 2022 and 10-2022-0105777, filed on Aug. 23, 2022, in the Korean Intellectual Property Office, the disclosures of which are incorporated by reference herein in their entities.

BACKGROUND

The inventive concepts relate to secure elements (SE), and more particularly, to SEs performing secure operations and electronic devices including the same.

Recently, as various functions are installed in electronic devices, the frequency of processing important data, such as personal information and security information, in electronic devices has increased. Electronic devices include an SE that performs a secure operation on important data in order to prevent hacking of important data.

The SE may be implemented as any one of an integrated SE included in a system-on-chip (SoC) included in the electronic device and a discrete SE disposed outside the SoC.

The integrated SE may directly access an external memory connected to the SoC to perform a secure operation. However, the integrated SE is difficult to commercialize due to issues, such as structural limitations within the SoC (e.g., semiconductor processes of the SoC and the integrated SE are different), and thus, the integrated SE needs to be implemented as a discrete SE.

However, due to the limitation of the capacity of an internal memory included in the discrete SE, it may be difficult to store all of various important data having large capacity.

SUMMARY

The inventive concepts provide secure elements (SE) that perform secure operations using an external memory connected to a system-on-chip (SoC) and electronic devices including the same.

According to aspects of the inventive concepts, there is provided a secure element (SE) coupled to a system-on-chip (SoC), including an internal memory, virtual secure direct memory access (DMA) circuitry configured to perform a secure operation using an external memory connected to the SoC in association with the internal memory, and an SE interface circuitry configured to output secure data and a write request generated by the virtual secure DMA circuitry to the SoC, the secure data being stored in the external memory.

According to aspects of the inventive concepts, there is provided an electronic device including an external memory, a system-on-chip (SoC) coupled to the external memory, and a first SE coupled to the SoC, the first SE including first SE interface circuitry configured to transmit first secure data to the SoC to write the first secure data to the external memory and receive the first secure data read from the external memory, from the SoC and a first virtual secure DMA circuitry configured to generate the first secure data and perform a verification operation on the first secure data.

According to aspects of the inventive concepts, there is provided an electronic device including a first external memory, a second external memory, a first integrated circuit (IC) coupled to the first external memory, and a second IC coupled to the second external memory, the first IC including a first interface circuitry configured to transmit first secure data to the second IC to write the first secure data to the second external memory and receive the first secure data read from the second external memory, from the second IC and first virtual secure DMA circuitry configured to generate the first secure data in a generation operation and perform a verification operation on the first secure data.

BRIEF DESCRIPTION OF THE DRAWINGS

Example embodiments will be more clearly understood from the following detailed description taken in association with the accompanying drawings in which:

FIG. 1 is a block diagram schematically illustrating an electronic device according to some example embodiments;

FIGS. 5A and 5B are views illustrating an operation of virtual secure direct memory access (DMA) circuitry according to some example embodiments;

FIG. 10 is a block diagram illustrating an electronic device according to some example embodiments;

FIG. 14 is a conceptual diagram illustrating an Internet of things (IoT) network system to which example embodiments are applied.

DETAILED DESCRIPTION

Figure 1:
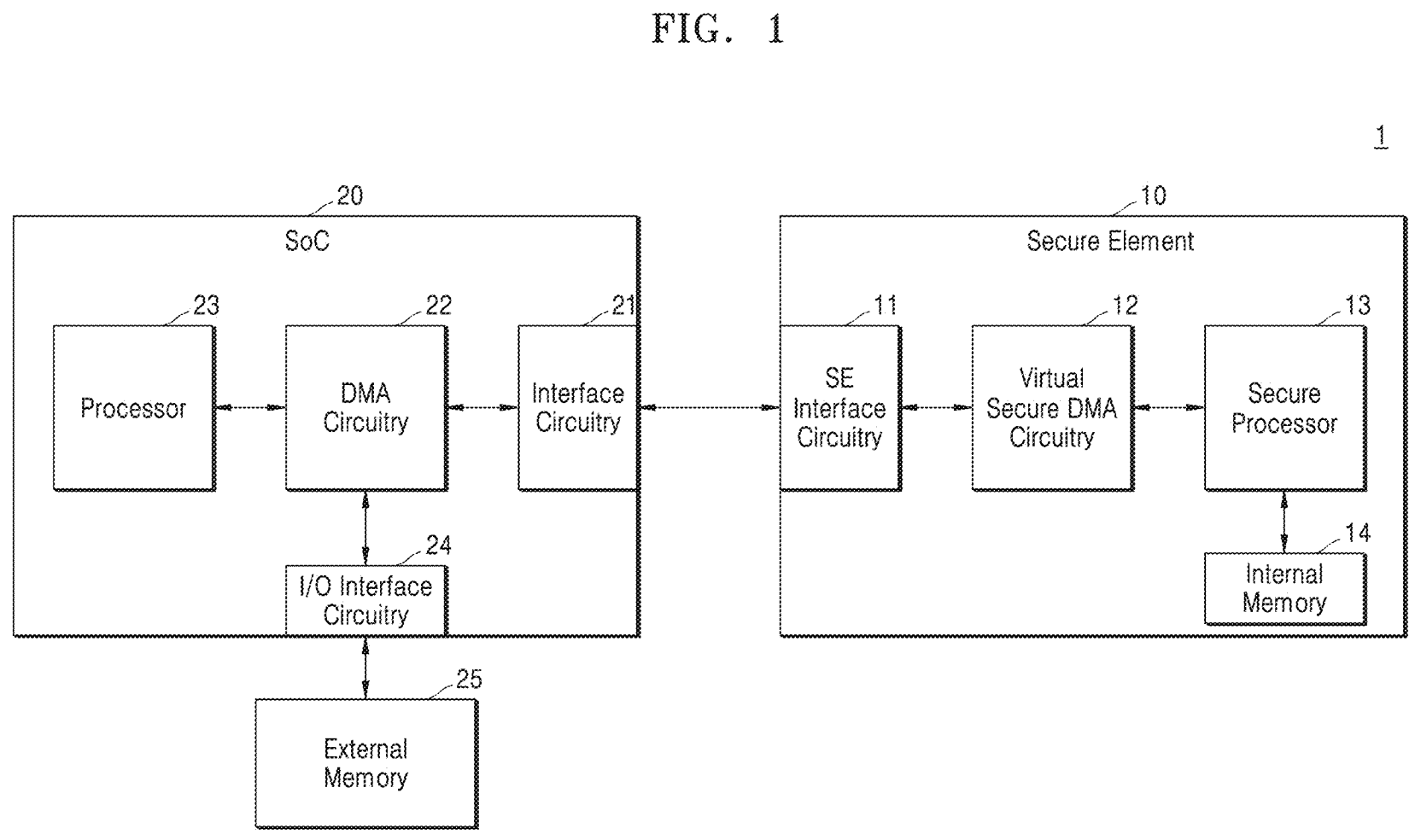
Figure 2:
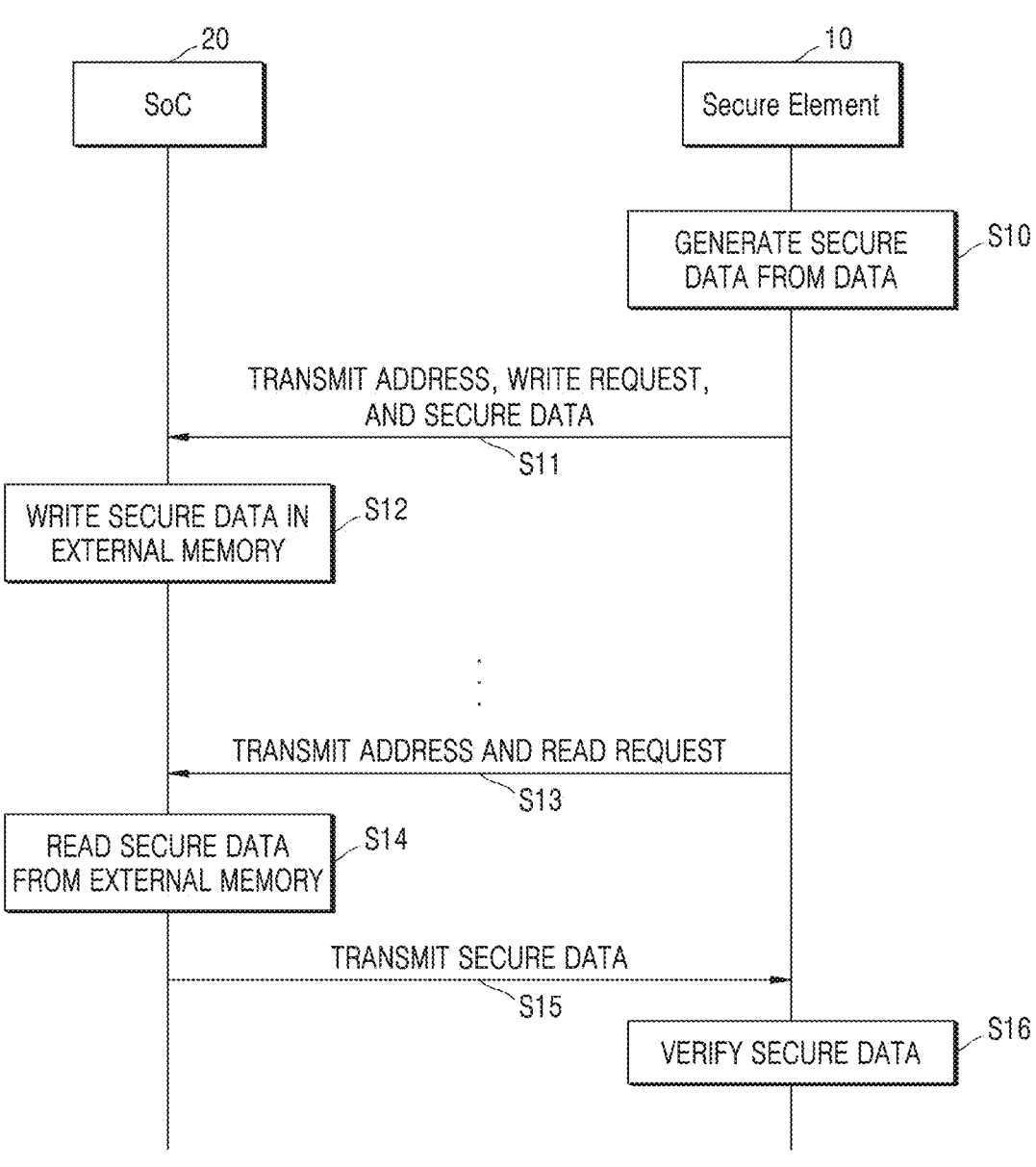
FIG. 2 is a flowchart illustrating an operating method of an electronic device according to some example embodiments.

FIG. 1 is a block diagram illustrating an electronic device 1 according to some example embodiments. FIG. 1 shows the electronic device 1 including only components necessary to explain the inventive concepts, and the electronic device 1 may further include other integrated circuits (ICs) (not shown) to which the inventive concepts are applicable.

Referring to FIG. 1, the electronic device 1 may include a secure element (SE) 10, a system-on-chip (SoC) 20, and an external memory 25.

In some example embodiments, the SE 10 may include secure element (SE) interface circuitry 11, virtual secure direct memory access (DMA) circuitry 12, a secure processor 13, and an internal memory 14.

In some example embodiments, the SoC 20 may include interface circuitry 21, DMA circuitry 22, a processor 23, and input/output (I/O) interface circuitry 24, and the SoC 20 may be connected to an external memory 25.

Example embodiments of the SE 10 and the SoC 20 described below may be implemented or supported by artificial intelligence technology or one or more computer programs, each of which includes computer-readable program code and may be implemented in a computer-readable medium included in each of the SE 10 and the SoC 20. The terms "application" and "program" refer to one or more computer programs, software components, sets of instructions, procedures, functions, objects, classes, instances, related data, or portions thereof suitable for implementation of suitable computer-readable program code. The term "computer-readable program code" includes any type of computer code including source code, object code, and executable code. The term "computer-readable medium" includes any type of medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. A non-transitory computer-readable medium includes a medium in which data may be permanently stored and a medium in which data may be stored and later overwritten, such as a rewritable optical disk or an erasable memory device.

The electronic device 1, 100, 200, 1000, 2000 etc. (or other circuitry, for example, SE 10, interface circuitry 11, DMA circuitry 12, secure processor 13, internal memory 14, SoC 20, interface circuitry 21, DMA circuitry 22, a processor 23, and input/output (I/O) interface circuitry 24, external memory 25, first SE interface 111, virtual secure DMA circuitry 112, secure processor 113, translation lookaside buffer (TLB) 114, memory management unit (MMU) 115, static random access memory (SRAM) 116, non-volatile memory (NVM) 117, bus 118, electronic device 100', 100", 100''' and subcomponents thereof, and network system 3000 and subcomponents thereof) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In some of the example embodiments described below, a hardware approach will be described as an example. However, although the example embodiments include technology using both hardware and software, the example embodiments do not exclude a software-based approach.

In some example embodiments, the SE 10 may perform a secure operation using the external memory 25. In the present specification, the secure operation may include an operation of generating secure data from data based on a root of trust (RoT) or a secure application and an operation of verifying the secure data. For example, the secure application may include a virus scan-related application, an encryption-related application, a firewall-related application, an intrusion detection system-related application, a spyware control program-related application, and the like.

In some example embodiments, the SE 10 may generate secure data from data and transmit the secure data together with a write request to the SoC 20, and the SoC 20 may write the secure data to the external memory 25 in response to the write request. In addition, the SE 10 may transmit a read request for secure data to the SoC 20, and the SoC 20 may transmit secure data read from the external memory 25 to the SE 10 in response to the read request. That is, in order to prevent or reduce data access, tampering, forgery, etc. in the SoC 20, a series of operations for generating secure data from data and verifying the secure data may be performed in the SE 10 side.

In some example embodiments, the SE 10 may perform a secure operation using the external memory 25 when an available capacity of the internal memory 14 for storing secure data is insufficient (e.g., there is not enough memory space, or other condition which prevents reliability storing the secure data). To this end, the SE 10 may separately receive a signal indicating whether the external memory 25 is available from the SoC 20, and perform a secure operation based on the received signal. In some example embodiments, the SE 10 may further include at least one pin for receiving the signal indicating whether the external memory 25 is available. In some example embodiments, the SE 10 may perform a secure operation using the external memory 25 in preference to the internal memory 14 (e.g., the SE 10 may rank the external memory at a higher priority for data storage than the internal memory 14). For example, the SE 10 may first determine availability of the external memory 25 before using the internal memory 14. In this case, the SE 10 may perform a secure operation using the internal memory 14 when receiving a signal indicating that the external memory 25 is not available from the SoC 20.

In some example embodiments, the secure processor 13 may execute a secure application to control overall secure operations. For example, the secure processor 13 may determine a secure operation using the external memory 25 based on at least one of a state of the internal memory 14, a state of the SoC 20, and a state of the external memory 25.

In some example embodiments, the virtual secure DMA circuitry 12 may generate secure data from data processed in the secure processor 13 in association with the internal memory 14 based on the executed secure application, or provide data obtained from the secure data verified by performing a verification operation on the secure data to the secure processor 13. In some example embodiments, the internal memory 14 may store keys corresponding to a secure application and an anti-replay counter (ARC) table, and the virtual secure DMA circuitry 12 may perform a secure operation using keys read from the internal memory 14 and the ARC table.

In some example embodiments, the SE interface circuitry 11 may transmit the secure data generated by the virtual secure DMA circuitry 12 to the interface circuitry 21 of the SoC 20 or receive secure data from the interface circuitry 21. In this specification, a series of operations for transmitting and receiving signals including secure data between the SE interface circuitry 11 and the interface circuitry 21 may be referred to as communication operations between the SE interface circuitry 11 and the interface circuitry 21. In addition, the SE interface circuitry 11 may transmit a write request or a read request or an address for the secure data to the interface circuitry 21. In some example embodiments, the SE interface circuitry 11 may include at least one SE interface. In some example embodiments, the at least one SE interface may correspond to any one of a serial-to-peripheral interface (SPI), an inter-IC interface, and an improved inter-IC to support a high communication rate.

In some example embodiments, the SE interface circuitry 11 may include a plurality of SE interfaces, and the virtual secure DMA circuitry 12 may select one of the SE interfaces based on the executed secure application to use the selected SE interface to transmit or receive secure data. In some example embodiments, the SE interfaces may support different communication rates.

In some example embodiments, the interface circuitry 21 may transmit secure data, an address, a write request, a read request, etc. received from the SE interface circuitry 11 to the DMA circuitry 22. Also, the interface circuitry 21 may transmit the secure data received from the DMA circuitry 22 to the SE interface circuitry 11. In some example embodiments, the interface circuitry 21 may include at least one interface.

In some example embodiments, the DMA circuitry 22 may write secure data to the external memory 25 through input/output (I/O) interface circuitry 24 in response to a write request received from the SE interface circuitry 11. The DMA circuitry 22 may read secure data from the external memory 25 through the I/O interface circuitry 24 in response to a read request received from the SE interface circuitry 11. The DMA circuitry 22 may access the external memory 25 in response to a write request or a read request without intervention of the processor 23. The DMA circuitry 22 may exclusively perform a memory operation on the secure data of the SE 10, that is, a memory operation using the I/O interface circuitry 24 and the external memory 25. However, this is only some example embodiments and the inventive concepts are not limited thereto, and the DMA circuitry 22 may separately perform a memory operation on data processed by the processor 23. In some example embodiments, the I/O interface circuitry 24 may include at least one I/O interface.

In some example embodiments, the processor 23 may control the overall operation of the SoC 20. The processor 23 may control the SE 10 to initiate an operation according to some example embodiments.

In some example embodiments, the external memory 25 may be implemented as DRAM corresponding to any one of double data rate synchronous dynamic random access memory (DDR SDRAM), low power double data rate (LPDDR) SDRAM, graphic double data rate (GDDR) SDRAM, rambus DRAM (RDRAM), etc. However, this is only some example embodiments, and the external memory 25 may be implemented as a resistive memory, such as resistive RAM (ReRAM), phase change RAM (PRAM), or magnetic RAM (MRAM) or a non-volatile memory, such as flash memory. The external memory 25 may include a first region in which data of the SoC 20 is stored and a second region in which data of the SE 10 is stored, and the first region and the second region may be physically or logically discriminated from each other. In some example embodiments, a size of each of the first region and the second region may be changed according to operations of the SE 10 and the SoC 20. In detail, when a size of data of the SoC 20 to be stored increases, the first region may be changed to be larger than before and the second region may be changed to be smaller than before. In addition, when a size of the data of the SE 10 to be stored increases, the first region may be changed to be smaller than before and the second region may be changed to be larger than before.

In some example embodiments, the external memory 25 may be implemented as a high bandwidth memory in which chips including DRAM are vertically stacked, and further, the chips may include DRAM including vertical pillar transistors.

In some example embodiments, the SE 10 and the SoC 20 may be formed through different semiconductor processes. In detail, the SoC 20 may be produced by a finer semiconductor process than the SE 10. For example, the SoC 20 may be produced by a semiconductor process having more resolution (e.g., capable of forming smaller or more complex structures), more accuracy of materials used, or other parameters one skilled in the art would understand as a finer semiconductor than the SE 10.

The SE 10 according to some example embodiments may generate secure data from data or directly perform verification on the secure data, and store the secure data in the external memory 25 connected to the SoC 20, thereby supplementing the limit of the capacity of the internal memory 14 of the SE 10 and, at the same time, preventing or reducing access, tampering, forgery, etc. on data through the SoC 20 to support high security performance.

FIG. 2 is a flowchart illustrating an operating method of an electronic device according to some example embodiments. The electronic device of FIG. 2 includes the SE 10 and the SoC 20.

Referring to FIG. 2, in operation S10, the SE 10 may generate secure data from data. In some example embodiments, the SE 10 may set an ARC prior to generating a hash key, an encryption key, and secure data corresponding to an executed secure application, and then generate secure data based on the set ARC. However, this is only some example embodiments and the inventive concepts are not limited thereto, and the SE 10 may generate secure data using various keys or values according to a type of the executed secure application. Some example embodiments of operation S10 is described below with reference to FIG. 5A.

In operation S11, the SE 10 may transmit an address, a write request, and secure data to the SoC 20. In some example embodiments, the SE 10 may sequentially transmit an address, a write request, and secure data in an agreed order through SE interface circuitry 11 supporting a high communication rate. In some example embodiments, the SE 10 may transmit at least two of an address, a write request, and secure data in parallel via a plurality of channels of the SE interface circuitry 11.

In operation S12, the SoC 20 may write secure data to a region corresponding to a received address of the external memory 25 connected thereto. In response to the write request, the SoC 20 may translate the received address to conform to an address system of the external memory 25, and write secure data to a region of the external memory 25 corresponding to the translated address. In some example embodiments, the SoC 20 may write the secure data to the external memory 25 by using the received address as is without translation. In this case, the SE 10 may generate an address translation table by receiving information on an address system of the external memory 25 from the SoC 20 in advance, and the corresponding address may be generated based on the address translation table.

In some example embodiments, operations S10-S12 may together be a write operation of the electronic device 1.

In operation S13, the SoC 20 may receive an address and a read request from the SE 10. In some example embodiments, the SE 10 may sequentially transmit the address and the read request in an agreed order through the SE interface circuitry 11 supporting a high communication rate. In some example embodiments, the SE 10 may separately transmit the address and the read request in parallel via a plurality of channels of the SE interface circuitry 11.

In operation S14, the SoC 20 may read secure data from a region corresponding to the received address of the external memory 25 connected thereto. In response to the read request, the SoC 20 may translate an address to conform to an address system of the external memory 25, and read secure data from a region of the external memory 25 corresponding to the translated address. In some example embodiments, the SoC 20 may read the secure data from the external memory 25 by using the received address as it is without translation.

In operation S15, the SoC 20 may transmit secure data to the SE 10.

In operation S16, the SE 10 may verify the secure data. In some example embodiments, the SE 10 may perform a verification operation on the secure data based on the hash key, the encryption key, and the set ARC used in operation S10. The SE 10 may use data obtained from the secure data when the data included in the secure data has passed integrity verification. Some example embodiments of operation S16 is described below with reference to FIG. 5B.

In some example embodiments, operations S13-S16 may together be a read operation of the electronic device 1.

Figure 3:
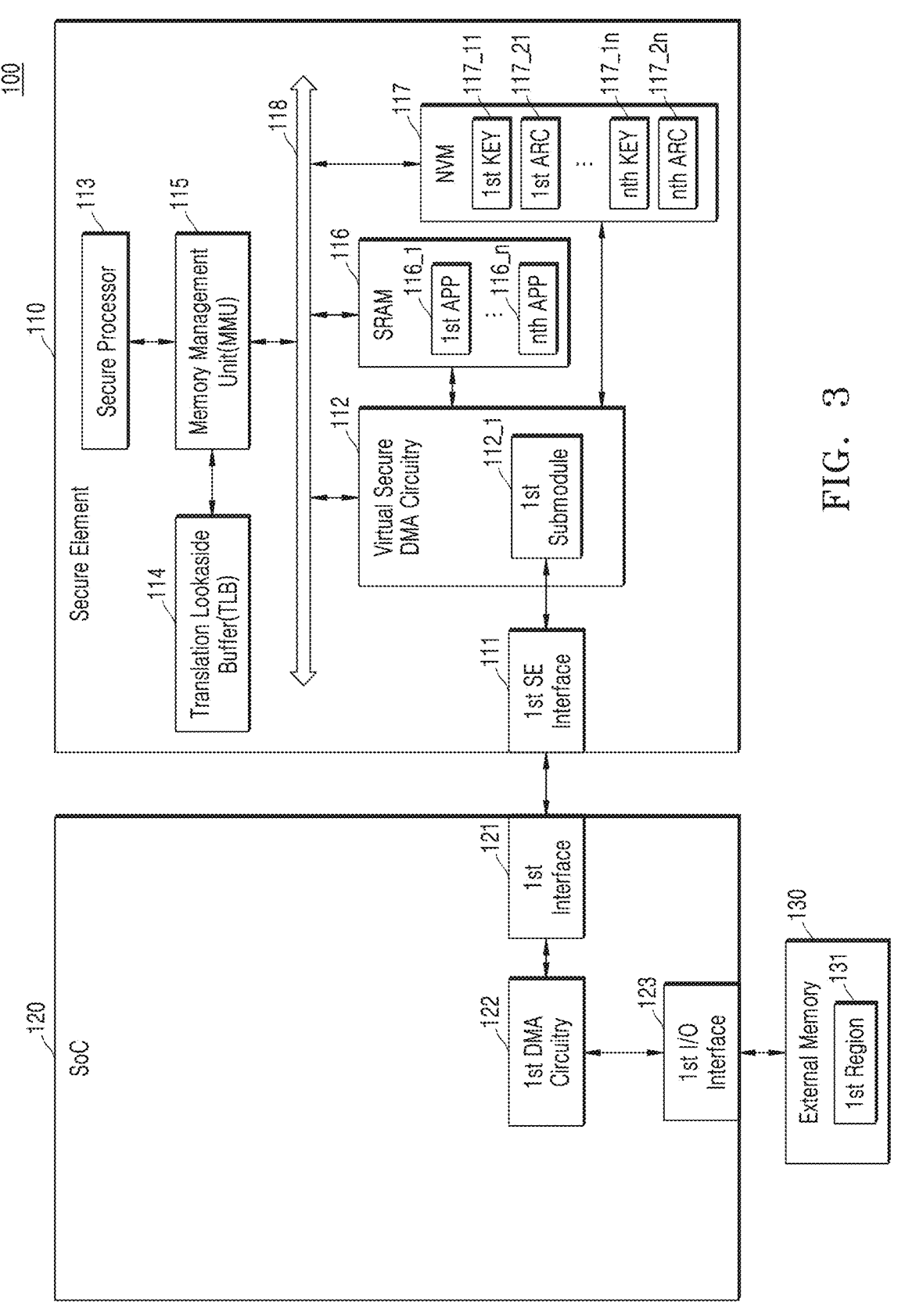
FIG. 3 is a block diagram illustrating an electronic device according to some example embodiments.

FIG. 3 is a block diagram illustrating an electronic device 100 according to some example embodiments.

Referring to FIG. 3, the electronic device 100 may include an SE 110, an SoC 120, and an external memory 130.

In some example embodiments, the SE 110 may include a first SE interface 111, virtual secure DMA circuitry 112, a secure processor 113, a translation lookaside buffer (TLB) 114, a memory management unit (MMU) 115, static random access memory (SRAM) 116, a non-volatile memory (NVM) 117, and a bus 118. The TLB 114, the SRAM 116, and the NVM 117 may be included in the internal memory 14 of FIG. 1.

In some example embodiments, the SoC 120 may include a first interface 121, first DMA circuitry 122, and a first I/O interface 123, and the SoC 120 may be connected to the external memory 130.

In some example embodiments, the SRAM 116 may store first to n-th secure applications 116_1 to 116_n. In this specification, the SRAM 116 may be referred to as a cache memory. The first to n-th secure applications 116_1 to 116_n of the SRAM 116 may be copied from ROM in the SE 110.

In some example embodiments, the secure processor 113 may execute any one of first to n-th secure applications 116_1 to 116_n. The MMU 115 may determine whether there is an available page in which data processed by the secure processor 113 is to be written or whether a page to be read exists in the internal memory using the TLB 114. In detail, the MMU 115 may change a virtual address received from the secure processor 113 into a physical address based on an address translation cache of the TLB 114, and determine whether a page corresponding to the resultant physical address exists in the TLB 114 or the SRAM 116. The secure processor 113 may control a secure operation of the SE 110 based on a result of the determination from the MMU 115. In detail, the secure processor 113 may control the secure operation using the external memory 130 when the result of the determination from the MMU 115 is a page fault. In some example embodiments, the MMU 115 may manage to perform a secure operation using the external memory 130 preferentially than the internal memory of the SE 110.

In some example embodiments, the virtual secure DMA circuitry 112 may include a first submodule 112_1. The first submodule 112_1 may generate secure data based on an executed secure application among the first to n-th secure applications 116_1 to 116_n or perform a verification operation on the secure data. The NVM 117 may store first to n-th keys 117_11 to 117_1n and first to n-th ARC tables 117_21 to 117_2n respectively corresponding to the first to n-th secure applications 116_1 to 116_n. The first submodule 112_1 may read the keys and the ARC table corresponding to the executed secure application from the NVM 117 to generate secure data or to verify the secure data.

In some example embodiments, the first SE interface 111 may transmit the secure data generated by the first submodule 112_1 to the first interface 121 of the SoC 120 or receive secure data from the first interface 121. The first SE interface 111 may be exclusively allocated to the first submodule 112_1. The first SE interface 111 may be implemented to support a communication rate and a communication method required by the SE 110.

In some example embodiments, the first interface 121 may transmit secure data, an address, a write request, and a read request received from the first SE interface 111 to the first DMA circuitry 122. The first interface 121 may transmit the secure data received from the first DMA circuitry 122 to the first SE interface 111. The first interface 121 may support the same communication rate and communication method as those of the first SE interface 111.

In some example embodiments, in response to a write request received from the first SE interface 111, the first DMA circuitry 122 may write secure data to a first region 131 of the external memory 130 through the first I/O interface 123. In response to a read request received from the first SE interface 111, the first DMA circuitry 122 may read secure data from the first region 131 of the external memory 130 through the first I/O interface 123. In some example embodiments, the first DMA circuitry 122 may exclusively connect to the first region 131 of the external memory 130.

In some example embodiments, the first region 131 of the external memory 130 may be set to vary. As an example, the first region 131 may vary depending on a type of a secure application executed in the SE 110. Also, the first region 131 may vary depending on a state of the SOC 120 (e.g., an operating mode of the SOC 120 or a required amount of memory space).

In some example embodiments, the first region 131 may be physically or logically divided for each secure application so that secure data corresponding to each of the first to n-th secure applications 116_1 to 116_n may be stored separately.

Figure 4A:
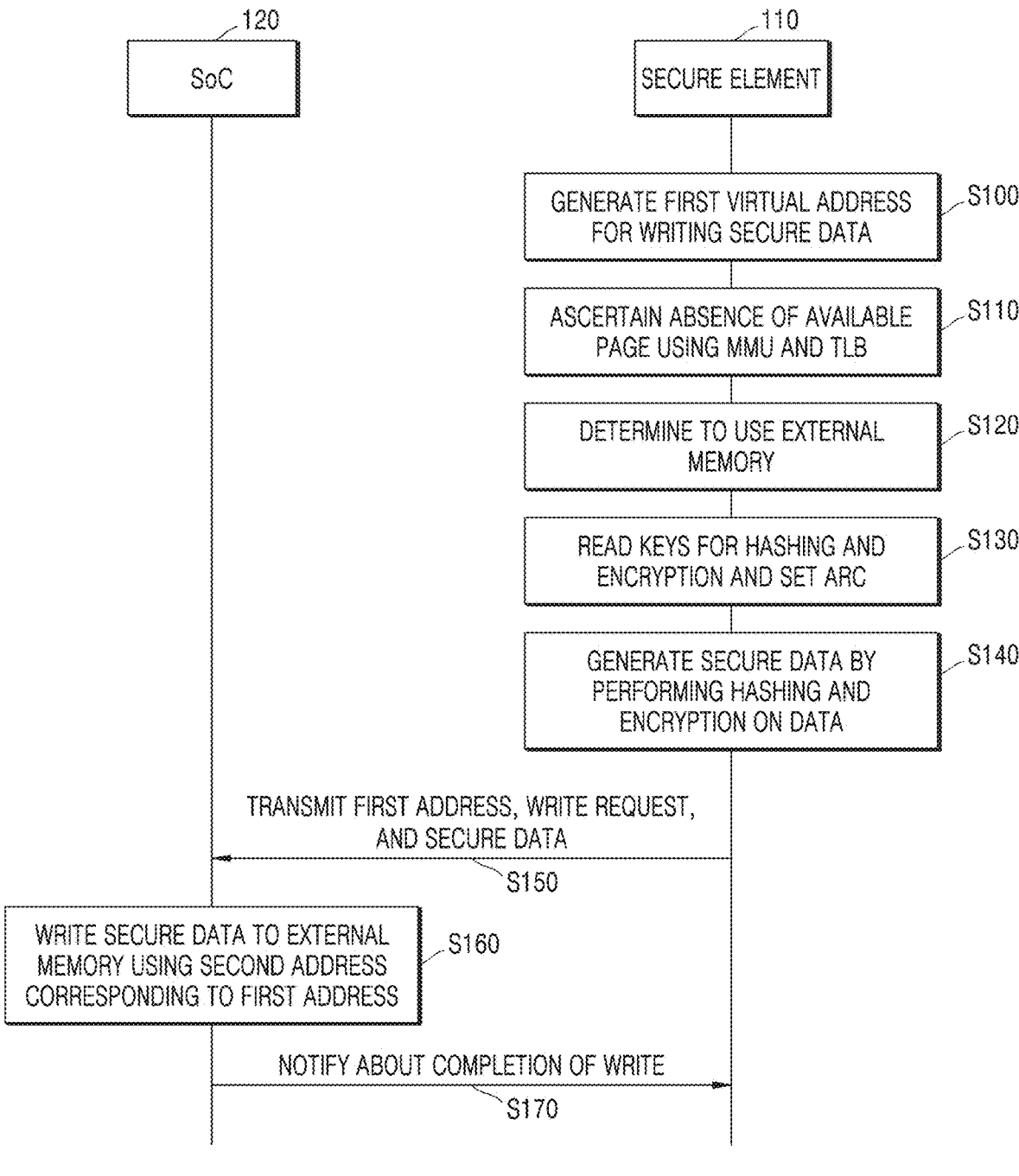
FIGS. 4A and 4B are flowcharts illustrating an operating method of an electronic device according to some example embodiments.
Figure 4B:
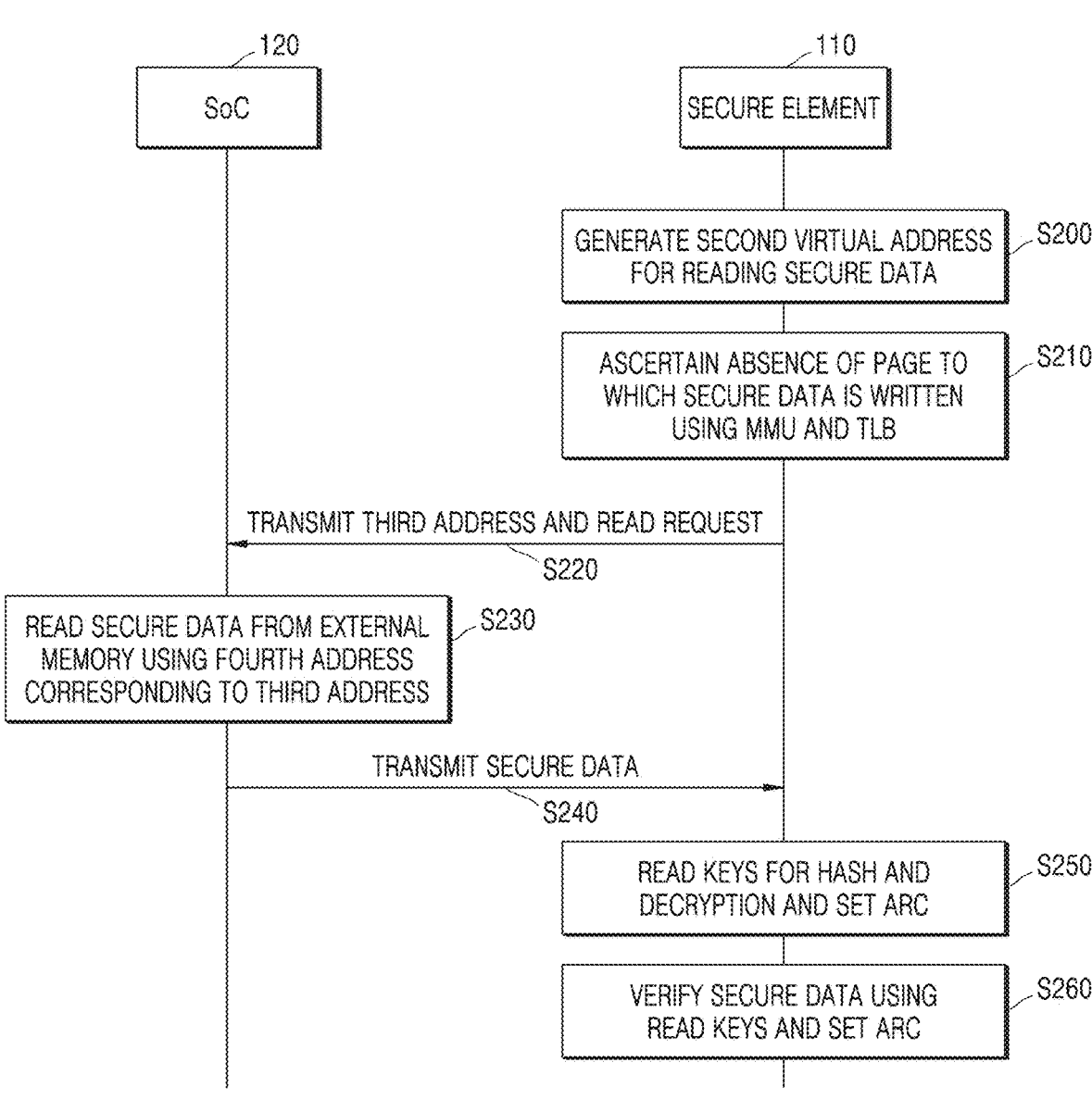

FIGS. 4A and 4B are flowcharts illustrating an operating method of an electronic device according to some example embodiments. The electronic device of FIGS. 4A and 4B may include the SE 110 and the SOC 120. Hereinafter, it will be described with further reference to FIG. 3 for better understanding.

Referring to FIG. 4A, in operation S100, the SE 110 may generate a first virtual address for writing secure data.

In operation S110, the SE 110 may determine absence of an available page of the TLB 114 or the SRAM 116 using the MMU 115 and the TLB 114. The SE 110 may translate a first virtual address into a first address based on the address translation cache of the TLB 114, and determine that an available page corresponding to the first address is absent in the TLB 114 or the SRAM 116. In other words, the SE 110 may determine that it is currently unable to store secure data in the TLB 114 or the SRAM 116.

In operation S120, the SE 110 may determine to use the external memory 130. In some example embodiments, based on operation S110 determining that it is currently unable to store secure data in the TLB 114 or the SRAM 116, the SE 110 determine to use the external memory 130.

In operation S130, the SE 110 may read keys for hashing and encryption from the NVM 117, and may set an ARC. The set ARC may be stored in the NVM 117. In detail, the set ARC may be included in the ARC table stored in the NVM 117.

In operation S140, the SE 110 may generate secure data by performing hashing and encryption on data based on the read keys.

In operation S150, the SE 110 may transmit a first address, a write request, and secure data to the SoC 120.

In operation S160, the SoC 120 may write secure data to the first region 131 of the external memory 130 using a second address corresponding to the first address. In some example embodiments, the first address may be the same as or different from the second address. When the first address is different from the second address, the SoC 120 may translate the first address into the second address based on a certain address translation table.

In operation S170, the SoC 120 may notify the SE 110 that the secure data has been written to the external memory 130. In some example embodiments, the first DMA circuitry 122 may transmit a notification signal indicating completion of writing for the secure data to the first SE interface 111 through the first interface 121.

Referring further to FIG. 4B, in operation S200, the SE 110 may generate a second virtual address for reading secure data.

In operation S210, the SE 110 may determine the absence of a page to which secure data is written in the TLB 114 or the SRAM 116 using the MMU 115 and the TLB 114. The SE 110 may translate the second virtual address into a third address based on the address translation cache of the TLB 114, and determine that there is no page corresponding to the third address in the TLB 114 or the SRAM 116. In other words, the SE 110 may determine that no secure data is currently stored in the TLB 114 or the SRAM 116. In some example embodiments, the SE 110 may store addresses corresponding to a plurality of pieces of secure data stored in the external memory 130, compare the third address translated from the second virtual address with the stored addresses, and determine whether secure data has been stored in the TLB 114 or the SRAM 116 based on a comparison result, instead of operation S210.

In operation S220, the SE 110 may transmit a third address and a read request to the SOC 120.

In operation S230, the SoC 120 may read secure data from the first region 131 of the external memory 130 using a fourth address corresponding to the third address. In some example embodiments, the third address may be the same as or different from the fourth address. When the third address is different from the fourth address, the SoC 120 may translate the third address into the fourth address based on a certain address translation table.

In operation S240, the SOC 120 may transmit secure data to the SE 110.

In operation S250, the SE 110 may read an ARC set immediately before the keys for hashing and decryption and the received secure data are generated in the SE 110, from the NVM 117.

In operation S260, the SE 110 may verify the secure data using the read keys and the set ARC. The SE 110 may process data obtained from the verified secure data.

Figure 5A:
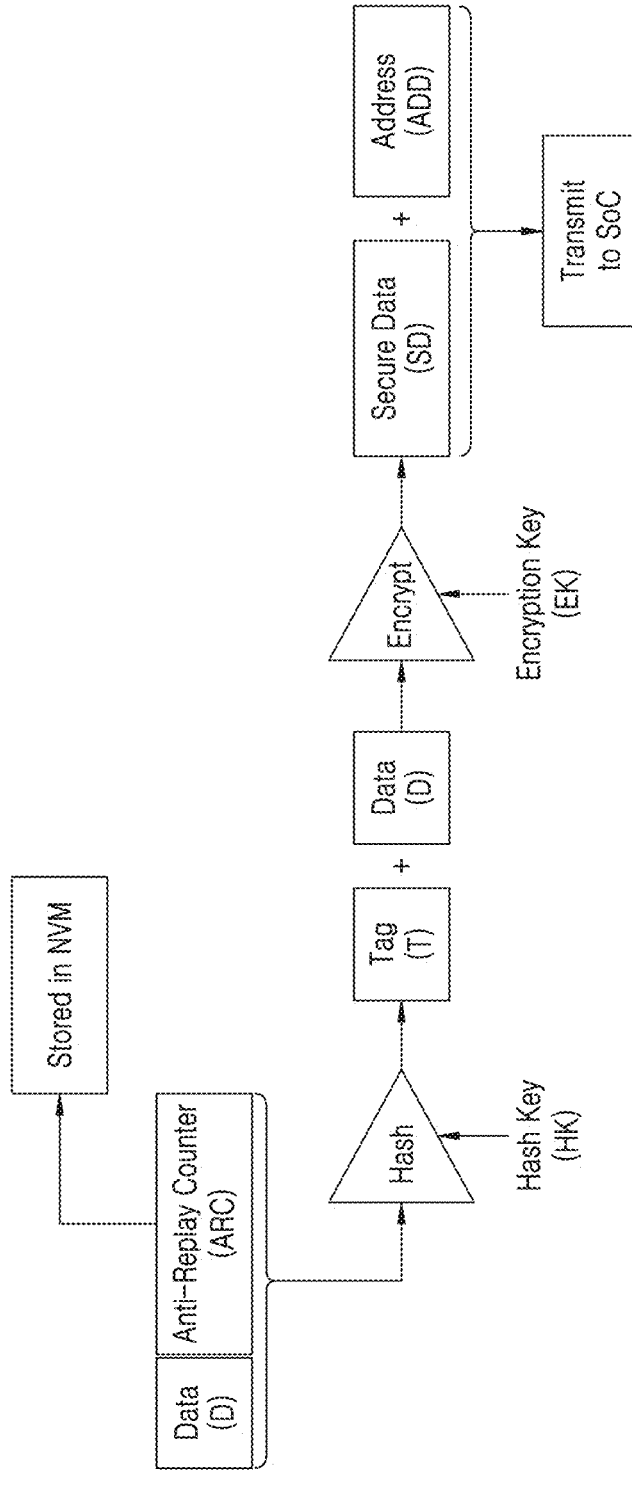
Figure 5B:
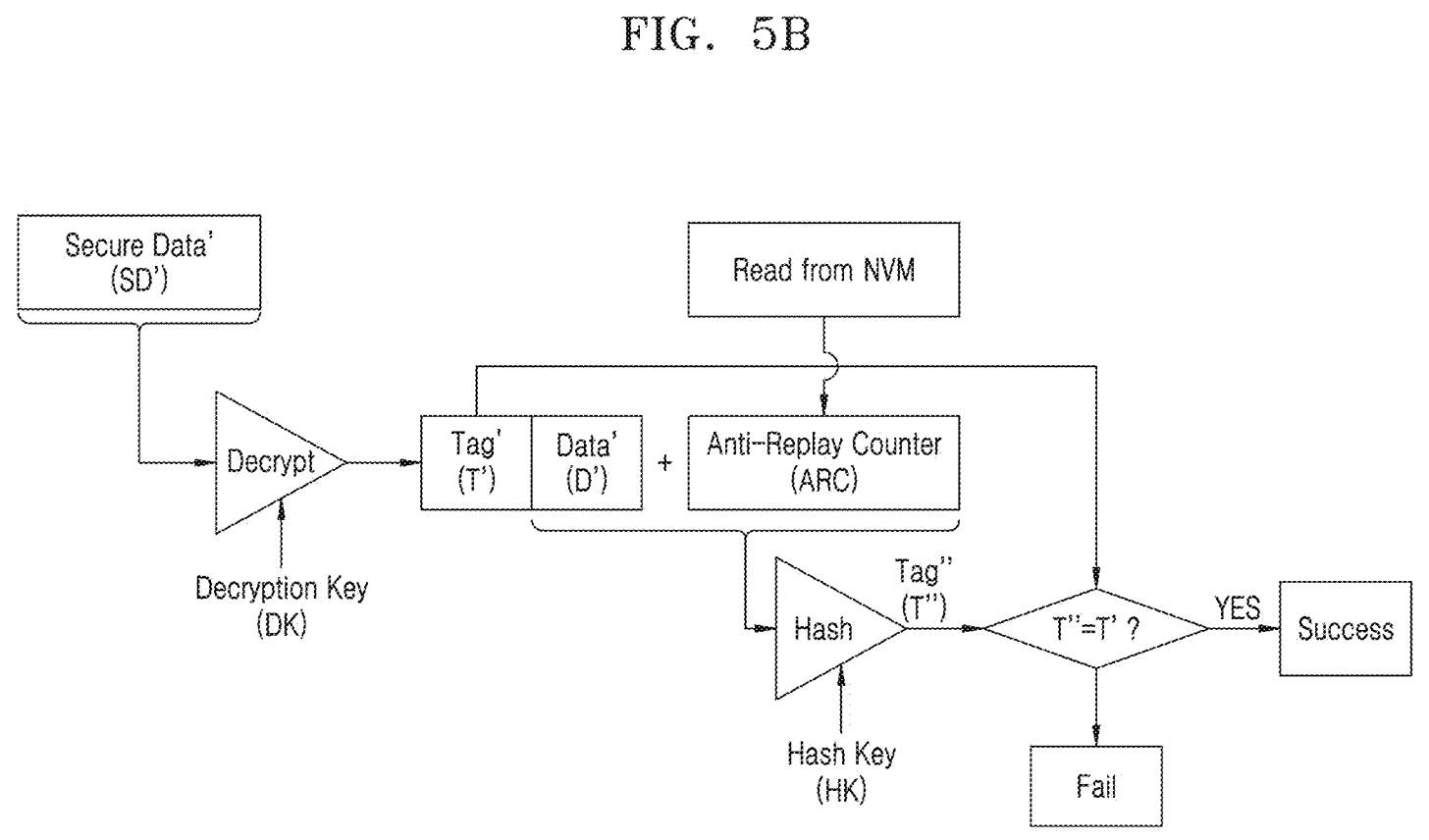

FIGS. 5A and 5B are views illustrating an operation of virtual secure DMA circuitry according to some example embodiments. It is assumed that second secure data SD' of FIG. 5B has been read from first secure data SD of FIG. 5A written to an external memory.

Referring to FIG. 5A, the virtual secure DMA circuitry may perform a hash operation using a hash key HK on a first packet including first data D and an ARC. The ARC may be set before performing the hash operation and stored in a NVM within the secure element SE.

A first tag T may be generated as a result of the hash operation, and the virtual secure DMA circuitry may perform an encryption operation using an encryption key EK on a second packet including the first tag T and the first data D.

As a result of the encryption operation, the first secure data SD may be generated, and the virtual secure DMA circuitry may transmit the first secure data SD together with an address ADD to the SoC through an SE interface circuitry.

Referring further to FIG. 5B, the virtual secure DMA circuitry may receive the second secure data SD' from the SoC through the SE interface circuitry, and perform a decryption operation on the second secure data SD' using a decryption key DK. The decryption key DK may correspond to the encryption key EK.

As a result of the decryption operation, a third packet including a second tag T' and second data D' may be generated. The virtual secure DMA circuitry may perform a hash operation using the hash key HK on a fourth packet including the second data D' and the ARC read from the NVM to generate a third tag T".

The virtual secure DMA circuitry may perform integrity verification on the second data D' by comparing the second tag T' to the third tag T". For example, when the second tag T' is not identical to the third tag T" (NO), it may be determined that the integrity verification has failed, and a determination result may be notified to the secure processor. As an example, when the second tag T' is identical to the third tag T" (YES), it may be determined that the integrity verification has been successful and the second data D' may be provided to the secure processor. According to some embodiments, the electronic device 100 may perform an operation (e.g., a calculation operation, a processing operation, a communication operation, etc.) based on the second data D' having been verified as secure.

According to some example embodiments, improved devices as disclosed herein, may improve reliability and structural robustness of the electronic device 100, while allowing for the integrity verification and access to sufficient memory spaces as required to manage the data D. Accordingly, improved devices may maintain normal operation, while being able to verify integrity, with sufficient reliability, and thereby reduce the occurrence of erroneous operation, delay and/or resource consumption (power, processor, memory, etc.).

Figure 6:
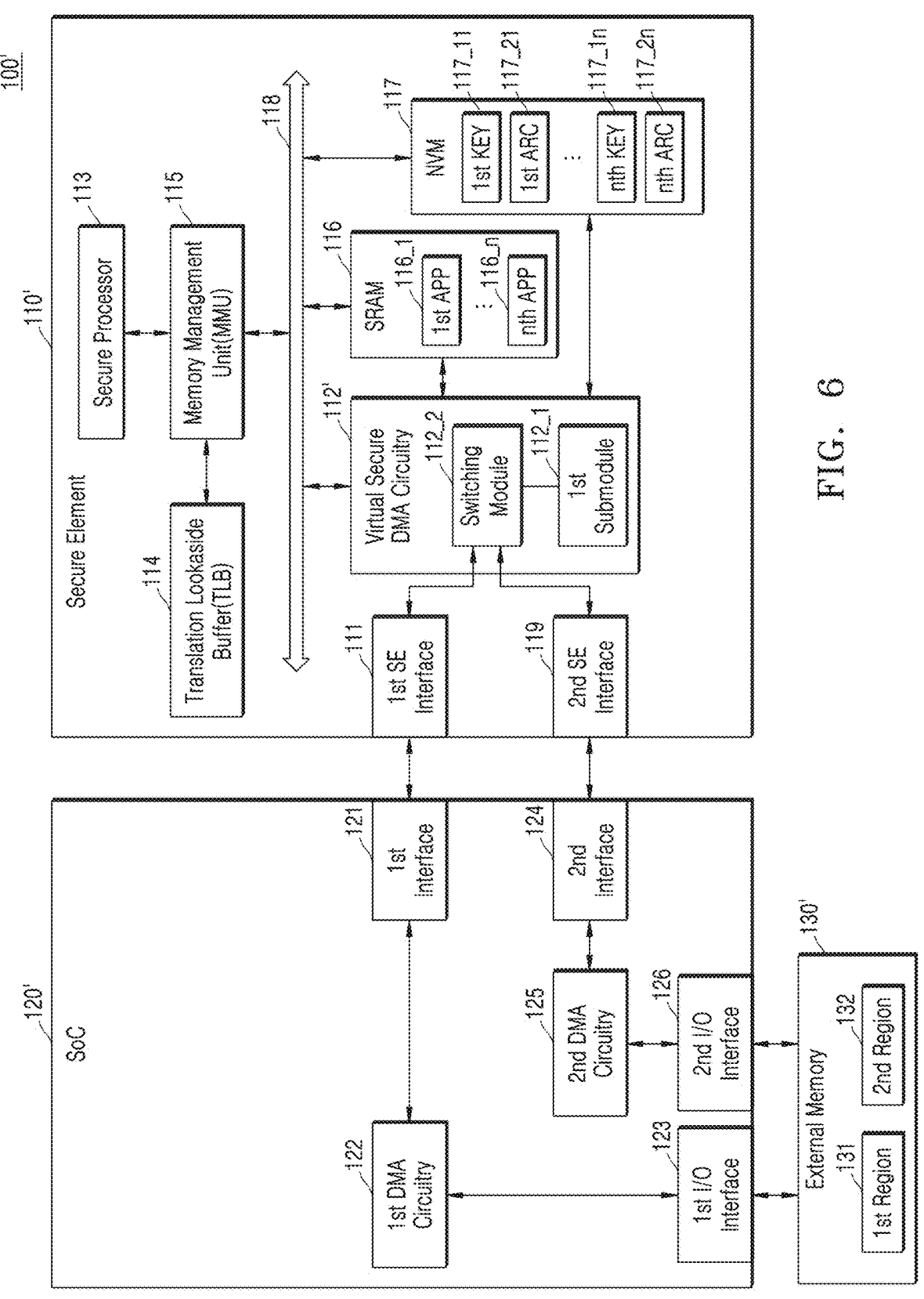
FIG. 6 is a block diagram illustrating an electronic device according to some example embodiments.

FIG. 6 is a block diagram illustrating an electronic device 100' according to some example embodiments. In FIG. 6, the same description as that of FIG. 3 is omitted.

Referring to FIG. 6, as compared to the SE 110 of FIG. 3, an SE 110' may further include a second SE interface 119, and virtual secure DMA circuitry 112' may further include a switching module 112_2. Compared to the SoC 120 of FIG. 3, the SoC 120' may further include a second interface 124, second DMA circuitry 125, and a second I/O interface 126. Also, compared to the external memory 130 of FIG. 3, an external memory 130' may further include a second region 132. However, in FIG. 6, the SE 110' is illustrated as including first and second SE interfaces 111 and 119, but this is only some example embodiments, and the inventive concepts are not limited thereto and may include more SE interfaces, and accordingly, the SoC 120' may include more interfaces to correspond thereto.

In some example embodiments, the first SE interface 111 and the second SE interface 119 may support different communication rates. For example, the first SE interface 111 may support a higher communication rate than the second SE interface 119. In some example embodiments, the first SE interface 111 and the second SE interface 119 may support different communication types.

In some example embodiments, the switching module 112_2 may control a connection between any one of the first and second SE interfaces 111 and 119 and the first submodule 112_1. In some example embodiments, the switching module 112_2 may select any one of the first and second SE interfaces 111 and 119 based on a data update frequency of the executed secure application among the first to n-th secure applications 116_1 to 116_$n$, and connect a selected one to the first submodule 112_1. As an example, when the data update frequency of the executed secure application is equal to or greater than a reference frequency, the switching module 112_2 may select the first SE interface 111 supporting a relatively high communication rate and connect the first SE interface 111 to the first submodule 112_1. As an example, when the data update frequency of the executed secure application is less than the reference frequency, the switching module 112_2 may select the second SE interface 119 supporting a relatively low communication rate and connect the second SE interface 119 to the first submodule 112_1.

In some example embodiments, the switching module 112_2 may select any one of the first and second SE interfaces 111 and 119 based on an operating mode of the SOC 120' and connect the selected one to the first submodule 112_1. As an example, when the operating mode of the SOC 120' is a high power mode, the switching module 112_2 may select the first SE interface 111 supporting a relatively high communication rate and connect the first SE interface 111 to the first submodule 112_1. As an example, when the operating mode of the SOC 120' is a low power mode, the switching module 112_2 may select the second SE interface 119 supporting a relatively low communication rate and connect the second SE interface 119 to the first submodule 112_1.

In some example embodiments, the first interface 121 may communicate with the first SE interface 111, and may support the same communication rate and communication method as those of the first SE interface 111. The second interface 124 may communicate with the second SE interface 119, and may support the same communication rate and communication method as those of the second SE interface 119.

In some example embodiments, the second interface 124 may transmit secure data, an address, a write request, and a read request received from the second SE interface 119 to the second DMA circuitry 125. The second interface 124 may transmit the secure data received from the second DMA circuitry 125 to the second SE interface 119.

In some example embodiments, in response to the write request received from the second SE interface 119, the second DMA circuitry 125 may write secure data to the second region 132 of the external memory 130' through the second I/O interface 126. The second DMA circuitry 125 may read secure data from the second region 132 of the external memory 130 through the second I/O interface 126.

In some example embodiments, the first region 131 of the external memory 130' may be connected exclusively by the first DMA circuitry 122, and the second region 132 of the external memory 130' may be connected exclusively by the second DMA circuitry 125.

In some example embodiments, the first and second regions 131 and 132 may be physically or logically distinguished from each other for each secure application so that secure data corresponding to each of the first to n-th secure applications 116_1 to 116_$n$ may be stored separately.

In some example embodiments, the SE 110' may select any one of the first and second SE interfaces 111 and 119, and perform a secure operation using the external memory 130' using the selected SE interface.

Figure 7:
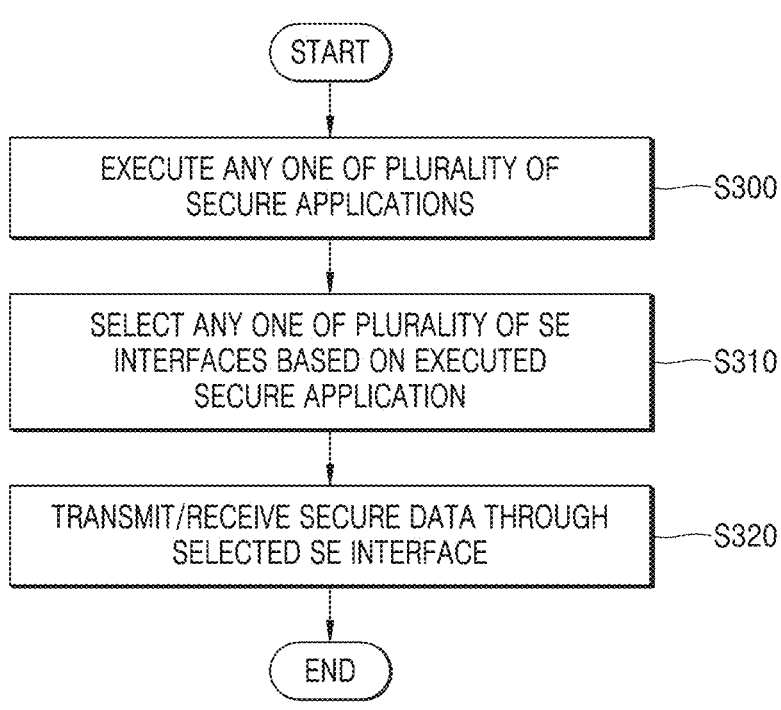
FIG. 7 is a flowchart illustrating an operating method of a secure element (SE) according to some example embodiments.

FIG. 7 is a flowchart illustrating an operating method of an SE according to some example embodiments.

Referring to FIG. 7, in operation S300, the SE may execute any one of a plurality of secure applications. In some example embodiments, the SE may receive a signal requesting or instructing to select and execute any one of the secure applications from the SoC, and execute a selected SE in response to the signal.

In operation S310, the SE may select any one of a plurality of SE interfaces included in an SE interface circuitry based on the executed secure application.

In operation S320, the SE may transmit and receive secure data to and from the SoC through the selected SE interface. In some example embodiments, the SE may perform a secure operation using an external memory of the SoC through the selected SE interface.

Figure 8:
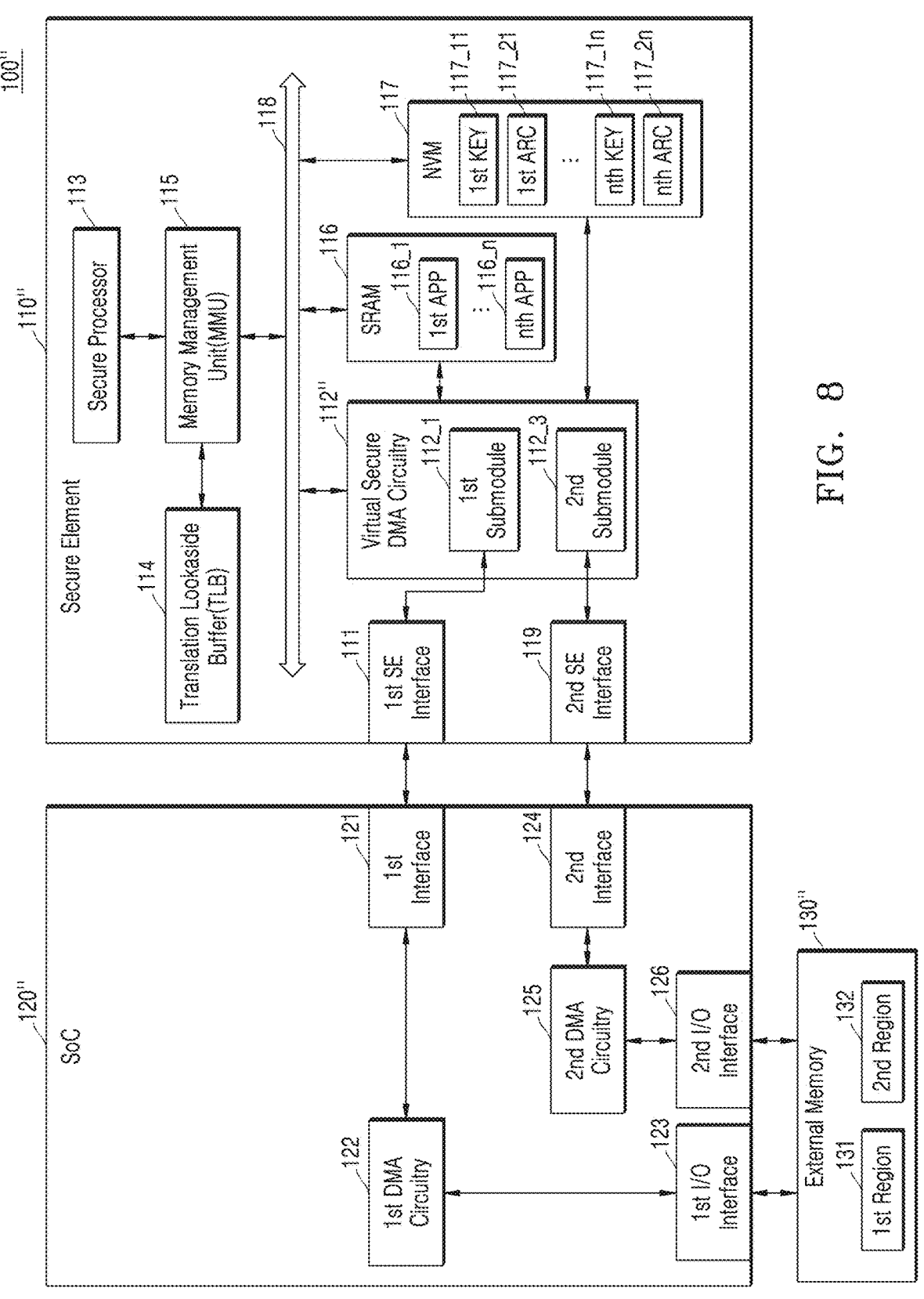
FIG. 8 is a block diagram illustrating an electronic device according to some example embodiments.

FIG. 8 is a block diagram illustrating an electronic device 100" according to some example embodiments. In FIG. 8, the same description as that of FIGS. 3 and 6 is omitted.

Referring to FIG. 8, compared to the SE 110 of FIG. 3, the SE 110" may further include a second SE interface 119, and virtual secure DMA circuitry 112" may further include a second submodule 112_3. Compared to the SoC 120 of FIG. 3, the SoC 120" may further include the second interface 124, the second DMA circuitry 125, and the second I/O interface 126. Also, compared to the external memory 130 of FIG. 3, an external memory 130" may further include the second region 132.

In some example embodiments, the first SE interface 111 may support the same or different communication rate as that of the second SE interface 119. In some example embodiments, the first SE interface 111 and the second SE interface 119 may support the same or different communication types.

In some example embodiments, the first SE interface 111 may be exclusively allocated to the first submodule 112_1, and the second SE interface 119 may be allocated exclusively to the second submodule 112_3.

In some example embodiments, the first submodule 112_1 may select any one of the first to n-th secure applications 116_1 to 116_$n$ and perform a secure operation based on the selected secure application. The second submodule 112_3 may select another one of the first to n-th secure applications 116_1 to 116_$n$ to perform a secure operation based on the selected secure application.

In some example embodiments, the first and second submodules 112_1 and 112_3 may perform a secure operation using the external memory 130" in parallel with each other by using the first and second SE interfaces 111 and 119, respectively. In some example embodiments, the first and second submodules 112_1 and 112_3 may each complementarily perform a secure operation using the external memory 130". In detail, the first submodule 112_1 may perform a secure operation based on any one of some of the first to n-th secure applications 116_1 to 116_$n$, and the second submodule 112_3 may perform a secure operation based on any one of the rest of the first to n-th secure applications 116_1 to 116_n.

In some example embodiments, the first and second DMA circuitries 122 and 125 may perform a memory operation in response to a request from the SE 110" using the first and second interfaces 121 and 124 and the first and second I/O interfaces 123 and 126. The first and second DMA circuitries 122 and 125 may perform memory operations in parallel with each other. In some example embodiments, the first and second DMA circuitries 122 and 125 may each perform a secure operation complementarily.

Figure 9:
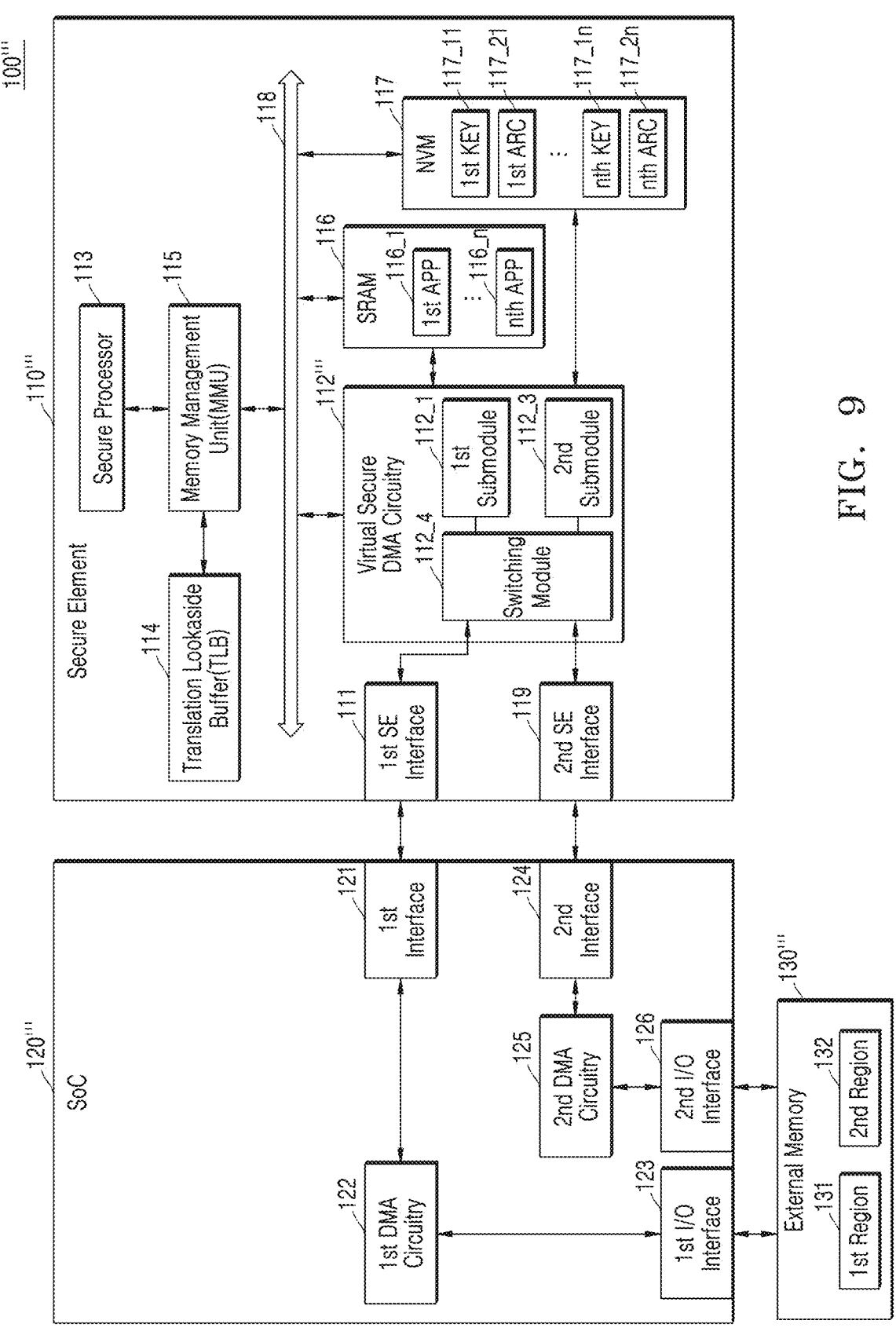
FIG. 9 is a block diagram illustrating an electronic device according to some example embodiments.

FIG. 9 is a block diagram illustrating an electronic device 100''' according to some example embodiments. With respect to FIG. 9, the same descriptions as those of FIGS. 3, 6 and 8 are omitted.

Referring to FIG. 9, compared to the SE 110 of FIG. 3, an SE 110''' may further include a second SE interface 119 and virtual secure DMA circuitry 112''' may further include a second submodule 112_3 and a switching module 112_4. In addition, compared to the SoC 120 of FIG. 3, an SoC 120''' may further include the second interface 124, the second DMA circuitry 125, and the second I/O interface 126. Also, compared to the external memory 130 of FIG. 3, the external memory 130''' may include the second region 132.

In some example embodiments, the first SE interface 111 and the second SE interface 119 may support different communication rates. For example, the first SE interface 111 may support a higher communication rate than that of the second SE interface 119. In some example embodiments, the first SE interface 111 and the second SE interface 119 may support different communication types.

In some example embodiments, the first submodule 112_1 may select any one of the first to n-th secure applications 116_1 to 116_n and perform a secure operation based on the selected secure application. The second submodule 112_3 may select another one of the first to n-th secure applications 116_1 to 116_n to perform a secure operation based on the selected secure application.

In some example embodiments, the first and second submodules 112_1 and 112_2 may perform a secure operation using the external memory 130''' in parallel to each other by using the first and second SE interfaces 111 and 119, respectively. In some example embodiments, the first and second submodules 112_1 and 112_3 may each perform a secure operation using the external memory 130''' complementarily.

In some example embodiments, the switching module 112_4 may control a connection between the first and second SE interfaces 111 and 119 and the first and second submodules 112_1 and 112_3. In some example embodiments, the switching module 112_4 may control a connection between the first and second SE interfaces 111 and 119 and the first and second submodules 112_1 and 112_3 based on secure applications based on each of the first and second submodules 112_1 and 112_3. For example, the switching module 112_4 may connect the first SE interface 111 supporting a relatively high communication rate to the first submodule 112_1, and connect the second SE interface 119 supporting a relatively low rate to the second submodule 112_3. In addition, the switching module 112_4 may connect the second SE interface 119 supporting a relatively low communication rate to the first submodule 112_1, and may connect the first SE interface 111 supporting a relatively high rate to the second submodule 112_3.

Figure 10:
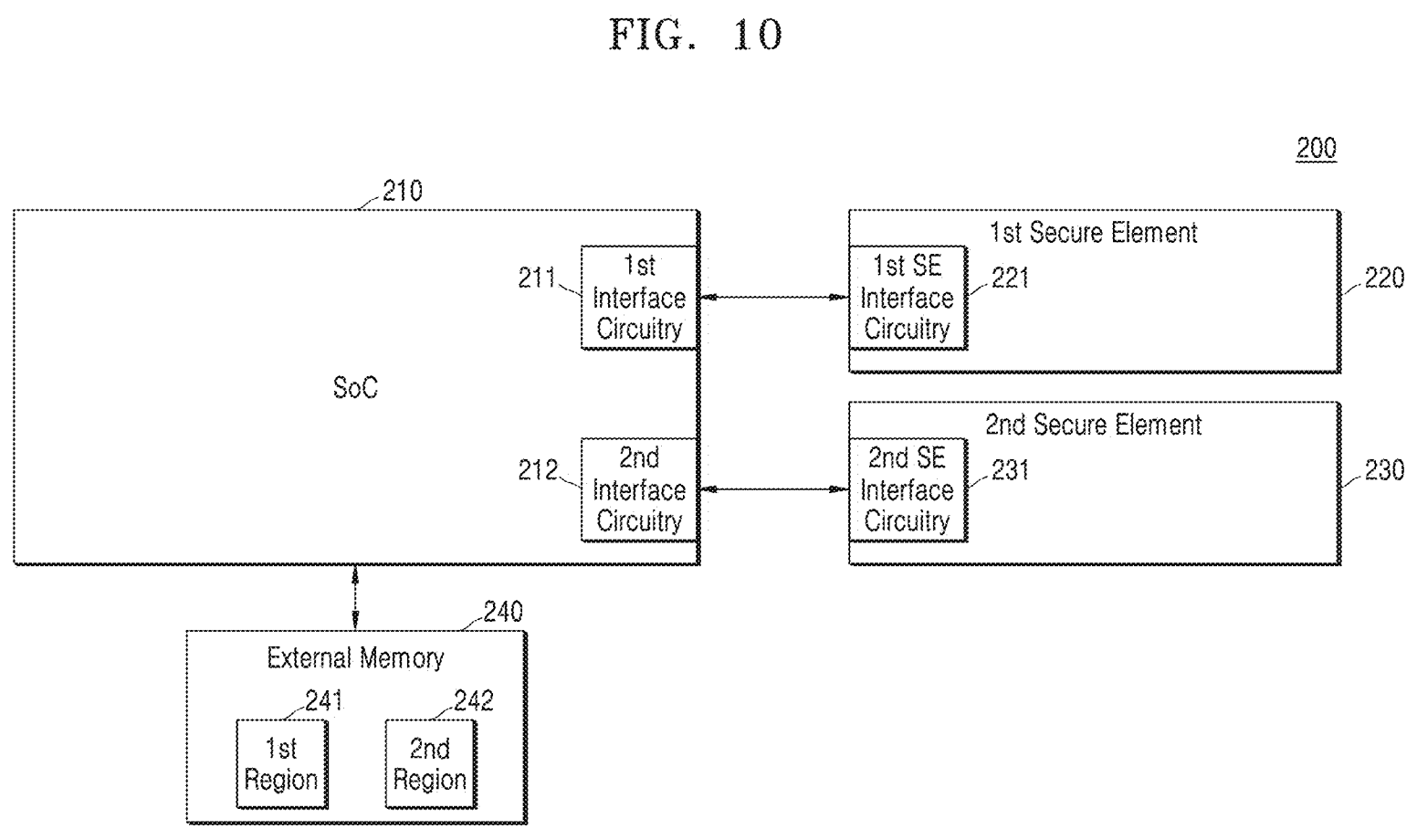

FIG. 10 is a block diagram illustrating an electronic device 200 according to some example embodiments.

Referring to FIG. 10, the electronic device 200 may include an SoC 210, a first SE 220, a second SE 230, and an external memory 240. The SoC 210 may include first and second interface circuitries 211 and 212. The first SE 220 may include first SE interface circuitry 221. The second SE 230 may include second SE interface circuitry 231. The external memory 240 may include first and second regions 241 and 242.

In some example embodiments, the first SE 220 may connect to the external memory 240 through communication with the first interface circuitry 211 of the SoC 210 through the first SE interface circuitry 221 to perform a secure operation. In detail, the first SE 220 may perform a secure operation using the first region 241 of the external memory 240 connected to the SoC 210.

In some example embodiments, the second SE 230 may connect to the external memory 240 through communication with the second interface circuitry 212 of the SoC 210 through the second SE interface circuitry 231 to perform a secure operation. In detail, the second SE 230 may perform a secure operation using the second region 242 of the external memory 240 connected to the SoC 210.

In some example embodiments, the first region 241 may store secure data of the first SE 220, and the second region 242 may store secure data of the second SE 230. For example, the first region 241 may be physically or logically separated from the second region 242.

However, FIG. 10 is only some example embodiments, and the inventive concepts are not limited thereto, and the electronic device 200 may further include more SEs, the SoC 210 may further include interface circuities for communicating with more SEs, and the external memory 240 may further include regions for storing secure data of more SEs.

Figure 11:
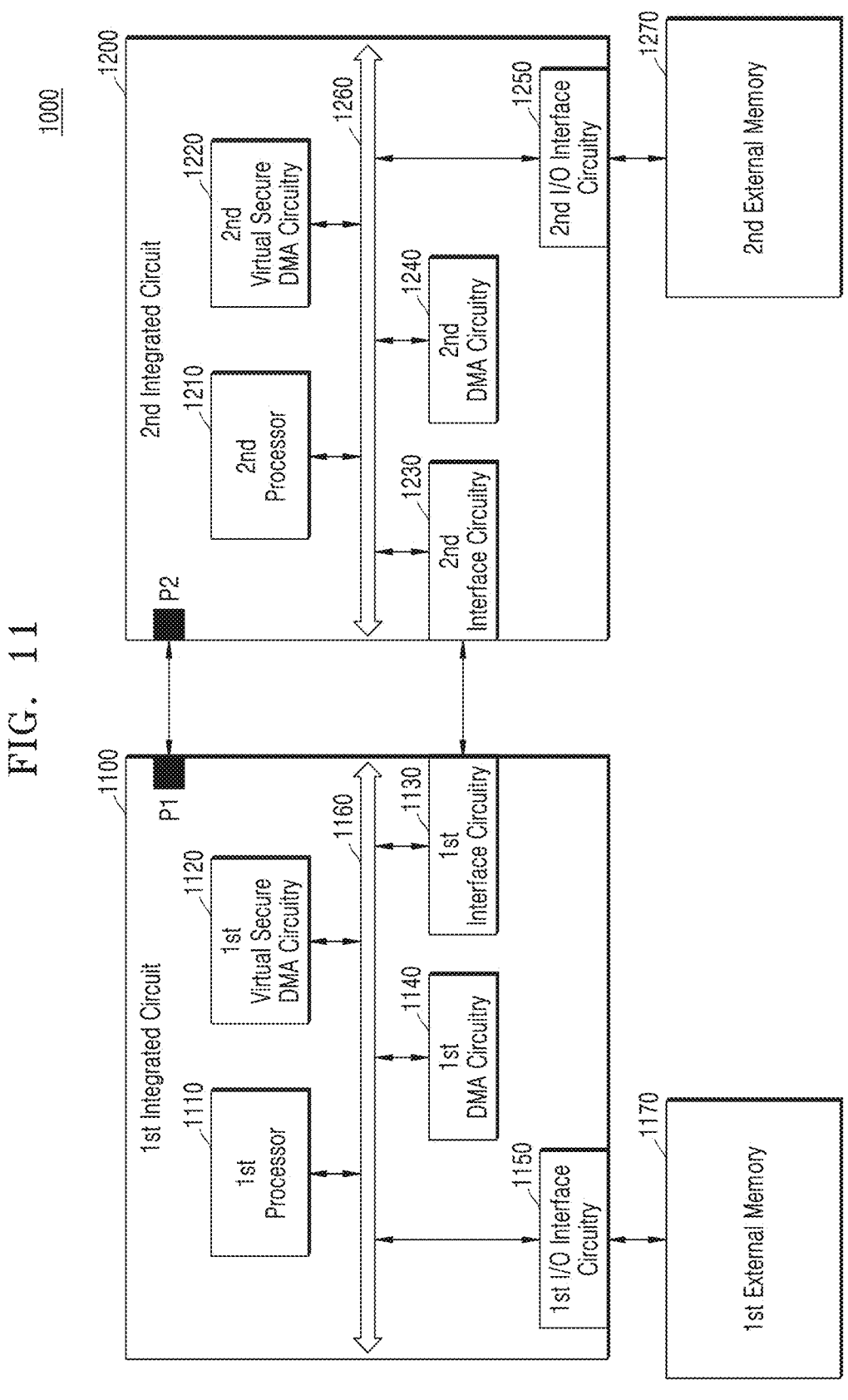
FIG. 11 is a block diagram illustrating an electronic device according to some example embodiments.

FIG. 11 is a block diagram illustrating an electronic device, according to some example embodiments.

Referring to FIG. 11, the electronic device 1000 may include a first IC 1100, a second IC 1200, a first external memory 1170, and a second external memory 1270.

In some example embodiments, the first IC 1100 may include a first processor 1110, first virtual secure DMA circuitry 1120, first interface circuitry 1130, first DMA circuitry 1140, first I/O interface circuitry 1150, a first bus 1160, and a first pin P1. The first IC 1100 may be connected to the first external memory 1170.

In some example embodiments, the second IC 1200 may include a second processor 1210, second virtual secure DMA circuitry 1220, second interface circuitry 1230, second DMA circuitry 1240, second I/O circuitry 1250, a second bus 1260, and a second pin P2. The second IC 1200 may be connected to the second external memory 1270.

In some example embodiments, the first IC 1100 may store first data processed by the first processor 1110 in the second external memory 1270 of the second IC 1200. The first IC 1100 may generate first secure data from the first data and store the generated first secure data in the second external memory 1270 in order to prevent or reduce access, forgery, tampering, and the like.

In detail, the first virtual secure DMA circuitry 1120 may generate first secure data from the first data. A method of generating the first secure data by the first virtual secure DMA circuitry 1120 may vary. The first virtual secure DMA circuitry 1120 may transmit the first secure data and a write request to the second IC 1200 through the first interface circuitry 1130. In response to the write request, the second DMA circuitry 1240 may write the first secure data received through the second interface circuitry 1230 to the second external memory 1270 through the second I/O interface circuitry 1250.

Also, the first virtual secure DMA circuitry 1120 may transmit a read request to the second IC 1200 through the first interface circuitry 1130. In response to the read request, the second DMA circuitry 1240 may read the first secure data from the second external memory 1270 through the second interface circuitry 1230. The second DMA circuitry 1240 may transmit the read first secure data to the first IC 1100 through the second interface circuitry 1230. The first virtual secure DMA circuitry 1120 may perform a verification operation on the first secure data received through the first interface circuitry 1130.

In some example embodiments, the first virtual secure DMA circuitry 1120 may receive a first signal indicating whether the second external memory 1270 is available from the second IC 1200 through the first pin P1 and perform a generating operation or a verification operation on the first secure data based on the first signal.

In some example embodiments, the first virtual secure DMA circuitry 1120 may perform an operation based on an executed secure application among a plurality of secure applications, and the first interface circuitry 1130 may operate at a communication rate according to the executed secure application.

In some example embodiments, the second IC 1200 may store the second data processed by the second processor 1210 in the first external memory 1170 of the first IC 1100. The second IC 1200 may generate second secure data from the second data and store the generated second secure data in the first external memory 1170 in order to prevent or reduce access, forgery, tampering, etc. of the second data in the first IC 1100. Details thereof are the same as those of the first IC 1100, and thus, a description thereof is omitted.

In some example embodiments, the second virtual secure DMA circuitry 1220 may receive a second signal indicating whether the first external memory 1170 is available from the first IC 1100 through the second pin P2 and perform a generating operation or a verification operation on the second secure data based on the second signal.

In some example embodiments, the second virtual secure DMA circuitry 1220 may perform an operation based on an executed secure application among a plurality of secure applications, and the second interface circuitry 1230 may operate at a communication rate according to the executed secure application.

As shown in FIG. 11, each of the first and second ICs 1100 and 1200 may complementarily perform a memory operation including a secure operation using the first and second external memories 1170 and 1270. That is, the first IC 1100 may use the second external memory 1270 connected to the second IC 1200 when a usable capacity of the first external memory 1170 is insufficient. The second IC 1200 may use the first external memory 1170 connected to the first IC 1100 when a usable capacity of the second external memory 1270 is insufficient.

Figure 12:
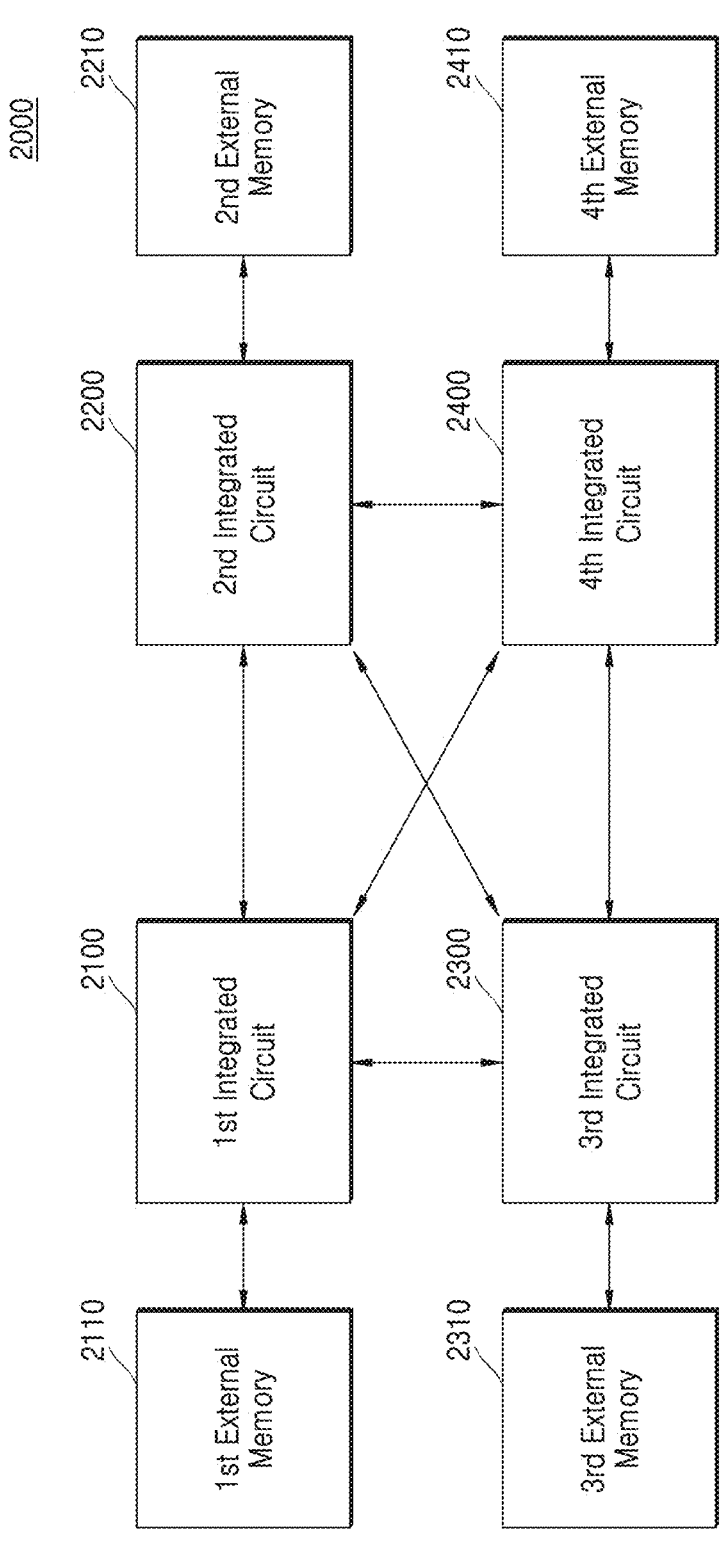
FIG. 12 is a block diagram illustrating an electronic device according to some example embodiments.

FIG. 12 is a block diagram illustrating an electronic device 2000 according to some example embodiments.

Referring to FIG. 12, the electronic device 2000 may include first to fourth ICs 2100 to 2400 and first to fourth external memories 2110 to 2410. The first to fourth ICs 2100 to 2400 may be connected to the first to fourth external memories 2110 to 2410, respectively.

In some example embodiments, each of the first to fourth ICs 2100 to 2400 may perform a memory operation using an external memory connected to another IC when a usable capacity of an external memory connected thereto is insufficient. The corresponding memory operation may include a secure operation according to some example embodiments.

In some example embodiments, each of the first to fourth ICs 2100 to 2400 may include interface circuitry for communicating with each other and virtual secure DMA circuitry for performing a secure operation. Furthermore, each of the first to fourth ICs 2100 to 2400 may include a pin for transmitting and receiving a signal in order to share whether an external memory thereof is available.

Each of the first to fourth ICs 2100 to 2400 may have the same or different functions. In addition, each of the first to fourth ICs 2100 to 2400 may be generated by the same or different semiconductor processes.

Figure 13:
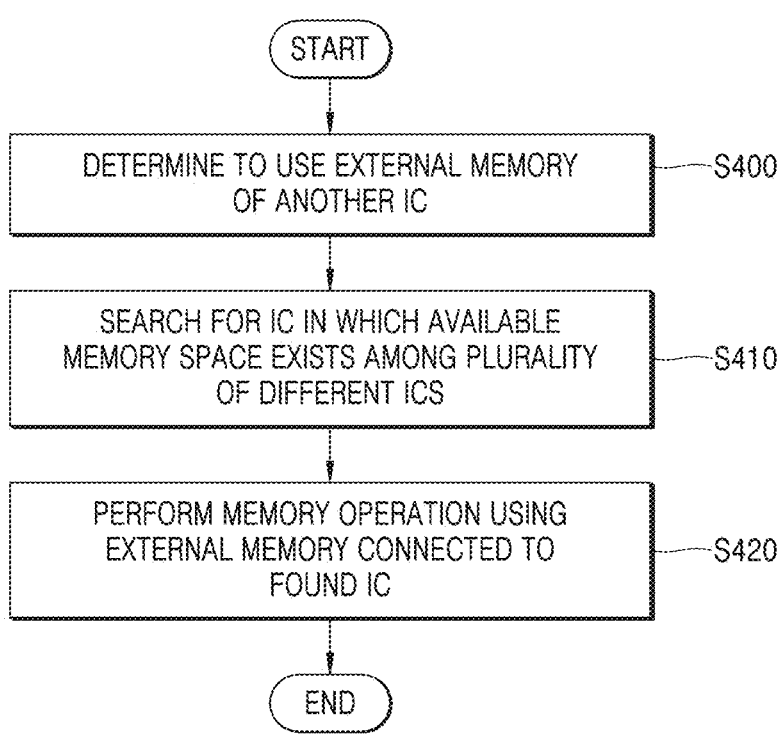
FIG. 13 is a flowchart illustrating an operating method of an integrated circuit (IC) according to some example embodiments.

FIG. 13 is a flowchart illustrating an operating method of an IC according to some example embodiments. The IC may be one of a plurality of ICs.

Referring to FIG. 13, in operation S400, the IC may determine to use a memory of another IC.

In operation S410, the IC may search for an IC having an available memory space among a plurality of other ICs.

In operation S420, the IC may perform a memory operation using an external memory connected to a searched IC. The corresponding memory operation may include a secure operation according to some example embodiments.

Figure 14:
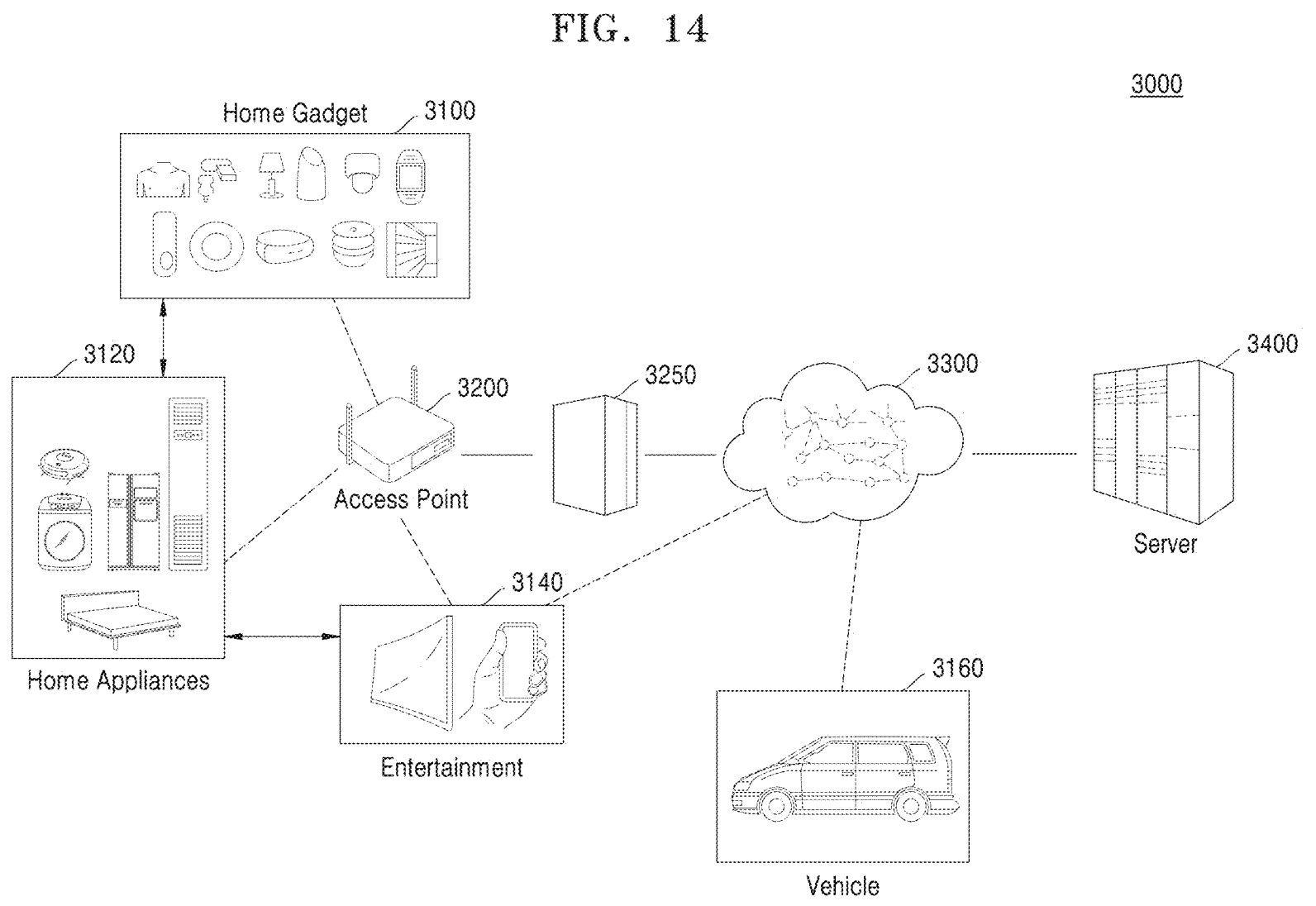

FIG. 14 is a conceptual diagram illustrating an Internet of things (IoT) network system 3000 to which embodiments are applied.

Referring to FIG. 14, the IoT network system 3000 may include a plurality of IoT devices 3100, 3120, 3140, and 3160, an access point 3200, a gateway 3250, a wireless network 3300, and a server 3400. The IoT may refer to a network between things using wired/wireless communication.

Each of the IoT devices 3100, 3120, 3140, and 3160 may form a group according to characteristics of each IoT device. For example, IoT devices may be grouped into a home gadget group 3100, a home appliance/furniture group 3120, an entertainment group 3140, or a vehicle group 3160. The IoT devices 3100, 3120, and 3140 may be connected to a communication network or connected to other IoT devices through the access point 3200. The access point 3200 may be embedded in one IoT device. The gateway 3250 may change a protocol to connect the access point 3200 to an external wireless network. The IoT devices 3100, 3120, and 3140 may be connected to an external communication network through the gateway 3250. The wireless network 3300 may include the Internet and/or a public network. The IoT devices 3100, 3120, 3140, and 3160 may be connected to the server 3400 providing a certain service through the wireless network 3300, and a user may use a service through at least one of the IoT devices 3100, 3120, 3140, and 3160.

According to some example embodiments, each of the IoT devices 3100, 3120, 3140, and 3160 may include an SE and an SoC, and the SE may perform a secure operation using an external memory connected to the SoC. Through this, the IoT devices 3100, 3120, 3140, and 3160 may perform an effective secure operation to provide a safe quality service to the user.

While the inventive concepts have been particularly shown and described with reference to some example embodiments thereof, it will be understood that various changes in form and details may be made therein without departing from the spirit and scope of the following claims.

What is claimed is:

1. A secure element (SE) coupled to a system-on-chip (SoC), the SE comprising:
an internal memory;
virtual secure direct memory access (DMA) circuitry configured to
perform a secure operation using an external memory connected to the SoC in association with the internal memory,
perform a hash operation using a hash key on a first packer including first data and an anti-replay counter (ARC) to generate a first tag and
perform an encryption operation using an encryption key on a second packet including the first tag and the first data to generate first secure data; and
SE interface circuitry configured to output the first secure data and a write request generated by the virtual secure DMA circuitry to the SoC,
the first secure data being stored in the external memory.

2. The SE of claim 1, wherein the internal memory includes a non-volatile memory storing an ARC table including the ARC.

3. The SE of claim 2, wherein
the SE interface circuitry is configured to output second secure data received from the SoC to the virtual secure DMA circuitry in response to a read request for the first secure data, and
the virtual secure DMA circuitry is configured to perform a decryption operation using a decryption key on the second secure data to generate a third packet including second data and a second tag, perform a second hash operation using the hash key on a fourth packet including the second data and the ARC read from the non-volatile memory to generate a third tag, and perform integrity verification on the second data by comparing the second tag with the third tag.

4. The SE of claim 1, wherein
the internal memory includes:
a cache memory configured to store a plurality of secure applications; and
a non-volatile memory configured to store hash keys, encryption keys, and ARC tables corresponding to each of the plurality of secure applications.

5. The SE of claim 4, wherein
the SE interface circuitry includes a plurality of SE interfaces, and
the virtual secure DMA circuitry is configured to
select one of the plurality of SE interfaces for communication with the SoC, and
perform the secure operation based on an executed secure application, among the plurality of secure applications.

6. The SE of claim 5, wherein
the plurality of SE interfaces are configured to support different communication rates, and
the virtual secure DMA circuitry is configured to select any one of the plurality of SE interfaces based on a data update frequency of the executed secure application.

7. The SE of claim 4, wherein
the virtual secure DMA circuitry includes a plurality of submodules configured to perform the secure operation based on each of executed secure applications among the plurality of secure applications, and
the SE interface circuitry includes a plurality of SE interfaces that are respectively dedicated to the plurality of submodules and configured to perform communication with the SoC.

8. The SE of claim 4, wherein
the SE interface circuitry includes a plurality of SE interfaces configured to perform communication with the SoC, and
the virtual secure DMA circuitry includes:
a plurality of submodules configured to perform the secure operation based on each of executed secure applications among the plurality of secure applications; and
a switching module configured to control a connection between the plurality of submodules and the plurality of SE interfaces.

9. The SE of claim 1, further comprising:
a memory management unit (MMU) configured to determine whether an available page exists in the internal memory using a translation lookaside buffer (TLB),
wherein the virtual secure DMA circuitry is configured to perform the secure operation based on a result of the determination.

10. The SE of claim 1, further comprising:
a pin configured to receive a signal indicating whether the external memory is available from the SoC,
wherein the virtual secure DMA circuitry is configured to perform the secure operation based on the signal.

11. An electronic device comprising:
an external memory;
a system-on-chip (SoC) coupled to the external memory; and
a first secure element (SE) coupled to the SoC,
the first SE including:
an internal memory;
a memory management unit configured to determine whether an available page exists in the internal memory using a translation lookaside buffer;
first SE interface circuitry configured to transmit first secure data to the SoC to write the first secure data to the external memory based an a result of the determination and receive the first secure data read from the external memory, from the SoC; and
first virtual secure DMA circuitry configured to generate the first secure data based on a set anti-replay counter (ARC) and a hash key and an encryption key read from a non-volatile memory of the first SE and perform a verification operation on the first secure data.

12. The electronic device of claim 11, wherein
the SoC includes:
first interface circuitry configured to transmit and receive the first secure data to and from the first SE interface circuitry;
a first input/output (I/O) interface circuitry configured to transmit and receive the first secure data to and from the external memory; and
first DMA circuitry configured to control writing of the first secure data to and reading of the first secure data from the external memory.

13. The electronic device of claim 11, further comprising:
a second SE coupled to the SoC,
wherein the second SE includes:
second SE interface circuitry configured to transmit second secure data to the SoC to write the second secure data to the external memory and receive the second secure data read from the external memory, from the SoC; and
second virtual secure DMA circuitry configured to generate the second secure data and perform a second verification operation on the second secure data.

14. The electronic device of claim 13, wherein the external memory includes:

a first memory region for the first SE; and a second memory region for the second SE and physically or logically separated from the first memory region.

15. The electronic device of claim 11, wherein the first SE further includes the non-volatile memory configured to store the hash key, the encryption key, and an ARC table, and the set ARC is included in the ARC table.

16. The electronic device of claim 11, wherein the first SE includes:

a cache memory configured to store a plurality of secure applications; and a non-volatile memory configured to store hash keys, encrypt keys, and ARC tables corresponding to each of the plurality of secure applications.

17. The electronic device of claim 16, wherein the first virtual secure DMA circuitry is configured to perform a generation operation or the verification operation on the first secure data based on an executed secure application among the plurality of secure applications.

18. The electronic device of claim 17, wherein the first SE interface circuitry includes a plurality of SE interfaces, and the first virtual secure DMA circuitry is configured to select any one of the plurality of SE interfaces based on the executed secure application for communication with the SoC.

19. An electronic device comprising:

a first external memory;

a second external memory;

a first integrated circuit (IC) coupled to the first external memory; and a second IC coupled to the second external memory, the first IC including:

first interface circuitry configured to transmit first secure data to the second IC to write the first secure data to the second external memory and receive the first secure data read from the second external memory, from the second IC; and first virtual secure direct memory access (DMA) circuitry configured to perform a hash operation using a hash key on a first packet including first data and a set anti-replay counter (ARC) to generate a first tag, perform an encryption operation using an encryption key on a second packet including the first tax and the first data to generate the first secure data in a generation operation, and perform a verification operation on the first secure data.

\* \* \* \* \*